(12) United States Patent
Heck et al.

(10) Patent No.: US 10,396,392 B2
(45) Date of Patent: Aug. 27, 2019

(54) ELECTROCHEMICAL CELL

(71) Applicant: The Swatch Group Research and Development Ltd, Marin (CH)

(72) Inventors: Pascal Heck, Erlach (CH); Michael Stalder, Bienne (CH); Fredy Zuellig, Delemont (CH); Kurosh Sohi, Hallwill (CH); Yves Leterrier, Lausanne (CH); Jericho Lynn Moll, Lausanne (CH); Jean-Baptiste Leran, Premanon (FR); Jan-Anders Manson, Chexbres (CH)

(73) Assignee: The Swatch Group Research and Development Ltd, Marin (CH)

( * ) Notice: Subject to any disclaimer, the term of this patent is extended or adjusted under 35 U.S.C. 154(b) by 889 days.

(21) Appl. No.: 14/769,179

(22) PCT Filed: Mar. 3, 2014

(86) PCT No.: PCT/EP2014/054093
§ 371 (c)(1),
(2) Date: Aug. 20, 2015

(87) PCT Pub. No.: WO2014/187583
PCT Pub. Date: Nov. 27, 2014

(65) Prior Publication Data
US 2015/0380764 A1    Dec. 31, 2015

(30) Foreign Application Priority Data

May 22, 2013 (EP) ..................................... 13168765

(51) Int. Cl.
*H01M 10/04* (2006.01)
*H01M 2/02* (2006.01)
(Continued)

(52) U.S. Cl.
CPC ........ *H01M 10/0436* (2013.01); *G04G 19/00* (2013.01); *H01M 2/0212* (2013.01);
(Continued)

(58) Field of Classification Search
None
See application file for complete search history.

(56) References Cited

U.S. PATENT DOCUMENTS 5,889,737 A    3/1999  Alameh et al.
2003/0134190 A1    7/2003  Ishida et al.
(Continued)

FOREIGN PATENT DOCUMENTS

EP    1 137 088 A1    9/2001
JP    1-167947 A    7/1989
(Continued)

OTHER PUBLICATIONS

International Search Report dated May 23, 2014, in PCT/EP2014/054093 filed Mar. 3, 2014.

*Primary Examiner* — Maria Laios
*Assistant Examiner* — Angela J Martin
(74) *Attorney, Agent, or Firm* — Oblon, McClelland, Maier & Neustadt, L.L.P.

(57) ABSTRACT

An electrochemical cell, including: a first current collector including a first collecting section in contact with a first electrode and including a first connecting section; a second current collector overlapping with the first current collector and including a second collecting section in contact with a second electrode and including a second connecting section; wherein the first and second current collectors are mutually connected via their first and second connecting sections and a distance between the first and second connecting sections is equal to or smaller than 50% of the distance between the first and the second collecting sections.

14 Claims, 4 Drawing Sheets

(51) Int. Cl.
*H01M 4/70* (2006.01)
*G04G 19/00* (2006.01)

(52) U.S. Cl.
CPC .............. *H01M 4/70* (2013.01); *H01M 2/027* (2013.01); *H01M 2/0275* (2013.01); *H01M 2220/30* (2013.01)

(56) References Cited

U.S. PATENT DOCUMENTS

| | | | |
|---|---|---|---|
| 2004/0041537 A1* | 3/2004 | Ishida | H01M 2/0212 320/107 |
| 2006/0196042 A1 | 9/2006 | Ishida et al. | |
| 2011/0189528 A1* | 8/2011 | Wu | H01M 2/0207 429/127 |
| 2013/0133185 A1 | 5/2013 | Wu et al. | |

FOREIGN PATENT DOCUMENTS

| | | | | |
|---|---|---|---|---|
| JP | 7-6771 A | | 1/1995 | |
| JP | 7-335208 A | | 12/1995 | |
| JP | 2006-172773 | * | 6/2006 | .............. H01M 2/02 |
| JP | 2006-172773 A | | 6/2006 | |
| JP | 2009-181831 A | | 8/2009 | |
| WO | WO 97/02513 A1 | | 1/1997 | |

* cited by examiner

A-A

B-B

C-C

D-D

ELECTROCHEMICAL CELL

CROSS-REFERENCE TO RELATED APPLICATIONS

This is a National phase application in the United States of International Patent Application PCT/EP2014/054093 filed Mar. 3, 2014 which claims priority on European patent application 13168765.9 filed May 22, 2013. The entire disclosures of the above patent applications are hereby incorporated by reference.

FIELD OF THE INVENTION

The present invention relates to the field of electrochemical cells comprising first and second current collectors in electrical contact with respective first and second electrodes. In particular, the invention relates to thin film batteries featuring a large degree of mechanical flexibility.

BACKGROUND AND PRIOR ART

Among a multitude of different battery types, there exist so-called thin film batteries. Those batteries only comprise a thickness in the range of nanometers, micrometers or millimeters. They may exhibit comparatively small dimensions and are therefore generally applicable to a large spectrum of different applications. Generally, such batteries or electrochemical cells can be formed into any arbitrary shape. They can be stacked, used in parallel and generally provide a comparatively large energy density.

Thin film electrochemical cells may also provide a particular mechanical flexibility. Hence, they are typically bendable and elastically deformable to a certain degree.

Electrochemical cells typically comprise an anode, an anode current collector, a cathode, a cathode current collector and a separator extending between anode and cathode. The electrochemical cell is impregnated with electrolyte and since it is generally liquid, it must be contained inside a tight external encapsulation. Moreover and in order to provide a desired mechanical flexibility, anode and cathode current collectors have to provide corresponding flexible properties. Since the current collectors are typically arranged at the outside facing portions of anode and cathode, they may become particularly subject to mechanical stress when the electrochemical cell is bent.

In practical applications and in particular after a number of bending or folding operations, e.g. after about 100 or 500 bending operations on a radius of curvature of 10 mm, conventional current collectors may exhibit a fissured structure or may even tend to show damaged portions at least on their surface. Such current collectors typically formed on the basis of metal foils therefore tend to deteriorate and leak in response to repeated bending or folding operations.

A multilayer structure of a thin and flexible electrochemical cell, such like a film-type battery is rather sensitive to bending or folding when the distance between mutually bonded or interconnected layers is rather large. When for instance two overlapping substrates 1, 2 as illustrated in FIG. 1 are mutually bonded along a lateral edge, e.g. by means of an adhesive 3 featuring a particular thickness, a bending of the substrates 1, 2 into a curved or bended configuration 1', 2' leads to a substantive shearing of the adhesive 3'. In order to bond or to interconnect substantially overlapping layers of e.g. an electrochemical cell, either a rather flexible adhesive has to be used or the thickness of the adhesive should be reduced to a minimum, in order to reduce such a bending-induced shearing and its negative impact on the tightness and durability of the adhesive.

On the one hand, rather flexible or elastic deformable adhesives may not provide sufficient gas barrier properties so that a multilayer structure or a respective electrochemical cell may exhibit overly fast aging. On the other hand, making use of a comparatively rigid or stiff adhesive featuring a sufficient gas tightness for the layers to be mutually bonded should not exceed a maximum thickness in order to enable a flexible bending of the multilayer structure at all.

However, when mutually bonding two current collectors in a battery application, serving as anode current collector and as cathode current collectors, their distance with respect to each other cannot be reduced below a predefined minimum of e.g. 400 μm. Otherwise, a desired electrical capacity of the battery cannot be achieved due to a reduced volume for the electro-active material.

It is therefore an object of the present invention to provide an improved electrochemical cell exhibiting a well defined and large degree of mechanical flexibility and tolerating repeated bending or folding operations with comparatively small bending radii. Additionally, the internal structure of the electrochemical cell should be rather simple, space saving and its production should be cost efficient. Moreover, the electrochemical cell should exhibit a multi-dimensional folding or a multi-dimensional flexibility, i.e., the electrochemical cell should be bendable with regard to at least two different directions.

SUMMARY OF THE INVENTION

In a first aspect an electrochemical cell is provided that comprises a first current collector having a first collecting section that is in contact with a first electrode. The first current collector further has a first connecting section for mechanically connecting the first current collector to a second current collector.

Consequently the electrochemical cell also comprises a second current collector substantially overlapping with the first current collector and having a second collecting section in contact with a second electrode. The second current collector also has a second connecting section, by way of which the second current collector is mechanically connectable with the first current collector.

Consequently, first and second current collectors are mechanically and mutually connected via their first and second connecting sections, respectively. Typically, first and second current collectors are arranged in an overlapping manner such, that their first and second connecting sections substantially overlap. Here, a distance d between first and second connecting sections is equal to or smaller than 50% of the distance D between the first and the second collecting sections of first and second current collectors.

With this arrangement the distance between the first and second current collectors is only in sections reduced compared to the overall distance D of first and second current collectors. The overall distance D between first and second current collectors is typically governed by the shape and size, in particular by the thickness of first and second electrodes sandwiched between first and second current collectors. The mutual distance between first and second current collectors in the region of their first and second connecting sections is however reduced in order to enable use of a comparatively rigid but gas tight adhesive for interconnecting or for bonding first and second current collectors, e.g. along an outer edge or frame portion thereof. The gas tight adhesive is electrically insulating.

Hence, at least one of first and second current collectors comprises an embossed or deformed surface portion to reduce the distance to the other current collector. In this way, the distance D between the collecting sections of first and second current collectors can be kept in a range that is reasonable for the electrochemical function of first and second current collectors while the distance d between first and second connecting sections can be reduced to enable use of adhesive material between first and second connecting sections that provides a sufficient tightness even under bending or folding conditions.

According to an embodiment at least one of the first and second collecting sections of respective first and second current collectors is integrally formed with the respective first or second connecting section. Typically, the first collecting section may be integrally formed with the first connecting section while the second collecting section may be integrally formed with the second connecting section. First and second collecting sections may then be located at a substantially constant distance D whereas first and second connecting section may be arranged and located at a reduced distance d.

The collecting sections of first and second current collectors as well as the connecting sections of first and second current collectors may comprise a substantially planar structure. The distance d or D typically extends perpendicular to the plane of the respective planar structure or planar surface of first and/or second collecting sections or connecting sections. In further typical configurations, the distance d is equal or less than 30% of D. Moreover, the distance d may be equal or less than 20% of D. Also, the distance d may be equal to or smaller than 10% of D or the distance d may be equal to or smaller than 5% of D.

Generally and by decreasing the distance d between first and second connecting sections, bending-induced mechanical stress or shearing effects on an adhesive extending between respective first and second connecting sections can be reduced. This allows to make use of comparatively rigid or stiff but gas- and liquid-tight adhesive materials.

According to another aspect, the distance d between first and second connecting sections may be in the range of the thickness of the first and/or second current collectors themselves. Moreover, the distance d between first and second connecting sections may equal 1-2 times or may equal 1-3 times the thickness of one of first and second current collectors.

In a typical configuration, wherein first and/or second current collectors may comprise an amorphous metal, the thickness of respective current collectors may be in a range between 20 and 30 µm. Then, the distance d or the gap between first and second connecting sections of first and second current collectors may be in a range between 10-60 µm. The distance d and hence the thickness of an adhesive structure between first and second connecting sections may further be around 30 µm.

According to another embodiment at least one of the first and second current collectors comprises a first or second profiled section between the first or second collecting section and the first or second connecting section, respectively. Typically, regarding the first current collector the first profiled section is located between the first connecting section and the first collecting section. Moreover, the first collecting section merges into the first connecting section via the first profiled section.

If the second current collector is provided with a second profiled section, the same is also valid here. Then, the second collecting section is interconnected with the second connecting section via the second profiled section. Also here, the second collecting section may merge into the second connecting section via the second profiled section.

The profiled section may provide a stepped profile in order to reduce the distance between first and second connecting sections of first and second current collectors.

According to a further embodiment, at least one of the first and second profiled sections merges with the first or second collecting sections and with the first or second connecting sections, respectively. Typically, the first profiled section merges with the first collecting section and merges in an opposite direction with the first connecting section. The same may also be valid for the second current collector. There, the second profiled section may merge with the second collecting section and in opposite direction with the second connecting section.

In order to reduce the distance in the region of first and second connecting sections it is generally sufficient, when only one of first and second current collectors comprises a profiled section while the other current collector may be substantially flat or even-shaped. In other embodiments it is however conceivable, that both, first and second current collectors feature mutually corresponding profiled sections in order to provide a rather symmetric geometry and in order to reduce the distance d between first and second connecting sections to a required degree. Such a symmetric shape of first and second current collectors is of further advantage in regard to the distribution of mechanical stress across and throughout the current collectors and their mutual interconnection.

According to another embodiment at least one of the first and second profiled sections comprises a flattened or stretched Z-shaped profile. Typically, the profiled section may just comprise a ramp portion by way of which substantially parallel oriented and even-shaped connecting and collecting sections mutually merge. Hence, the collecting and connecting sections are oriented substantially parallel like the upper and lower branch of a "Z" while the profiled section there between forms a ramp. Here, and in contrast to the shape of a "Z" both angles on opposite sides between the profiled section and the adjacently located connecting or collecting sections are larger than 90°. In terms of a surface normal of the planar-shaped collecting section, the respective collection section is shifted towards the oppositely located current collector. In case of the first current collector, the first connecting section is offset from the plane of the first collecting section in a direction towards the second current collector.

In embodiments wherein first and second current collectors feature respective first and second profiled sections the same is also valid for the second current collector.

Following a further embodiment, the distance d between the first and second connecting sections is equal to or smaller than 100 µm, 80 µm or 50 µm or the distance d between first and second connecting sections is between 50 µm and 25 µm. By reducing the distance between first and second connecting sections to values below 100 µm, shearing effects of an interconnecting adhesive between first and second connecting sections can be sufficiently reduced, thus allowing to make use of such adhesive materials that provide a sufficient sealing and tightness.

According to a further embodiment first and second connecting sections are mutually bonded by means of an electrically insulating adhesive to form an outer edge of the electrochemical cell. Typically, the surrounding edge of first and second current collectors are designed as respective first and second connecting sections that are arranged at a reduced distance d compared to the distance D of the electrochemically active first and second collecting sections thereof.

By means of mutually bonding first and second connecting sections along the outer circumference of first and second current collectors, the first and second electrodes as well as a separator positioned therebetween can be completely encapsulated by the first and second current collectors. The mutual bonding of first and second current collectors may therefore serve as an encapsulating housing of the electrochemical cell.

Additionally, the separator located between first and second electrodes may extend into the region of the first and second connecting sections. Here, the separator may be pinched by the connecting sections and may be equally bonded to the connecting sections of first and second current collectors.

According to another embodiment, the adhesive adapted to mutually connect first and second connecting sections of first and second current collectors comprises an epoxy glue typically comprising an epoxy resin and a hardener. Typically, the adhesive comprises a thermally curing adhesive. It may be provided as an adhesive foil attachable to at least one of first and second connecting sections prior to a final assembly of the electrochemical cell. The adhesive may comprise a single component epoxy glue or epoxy resin. Alternatively or additionally the adhesive may also comprise a two- or more component epoxy glue that may become subject to chemically triggered curing.

The first and/or second current collectors may comprise an inherent rigidity or inherent stiffness, which may even be enhanced by their first or second profiled sections, respectively. Introducing a profiled section in a substantially planar-shaped current collector may therefore generally counteract the bending behavior of the current collector itself.

According to another embodiment at least one of the first and second current collectors at least in sections comprises at least one inwardly extending longitudinal indentation to form at least one folding structure of the respective current collector. Typically, the inwardly extending longitudinal indentation provides a longitudinal groove which, from a mechanical point of view, may represent and provide a kind of a hinge with a hinge axis extending along said groove or folding structure. In the vicinity of the inwardly extending indentation, the electrode in mechanical contact with the inside facing portion of respective first and/or second current collectors may be reduced in thickness locally. The thickness reduction achieved by the longitudinal indentation however introduces an inherent folding capability of the entire electrochemical cell arrangement.

In a further embodiment at least one of the first and second current collectors comprises at least two separated and/or mutually intersecting folding structures provided by inwardly extending longitudinal indentations or by respective grooves in the respective first or second current collector. Typically, multiple folding structures are provided on at least one of first and second current collectors. Respective folding structures may extend parallel to each other at a predefined distance. For example, a number of folding structures may extend parallel and equidistant with respect to each other. Introducing such thickness reduced folding structures in at least one of first and second current collectors may already improve the bending capability and flexibility of the electrochemical cell.

According to a further embodiment the first current collector comprises at least a first indentation or a respective first folding structure and the second current collector comprises at least a second indentation or a respective second folding structure substantially overlapping with the first indentation or hence with the first folding structure. By providing substantially overlapping folding structures in both current collectors, the overall flexural behavior and flexibility of the entire electrochemical cell can be further improved.

According to another embodiment at least two of the folding structures extend substantially parallel with respect to each other or at a predetermined angle, e.g. between 30° and 90° with respect to each other, in the plane of the first and/or the second collecting sections. Typically, the folding structures are located outside the connecting sections of first and/or second current collectors. In further embodiments, the at least one folding structure of first or second current collectors extending across the current collector extend into or merge with the outer surface of respective first and/or second connecting sections.

Hence, connecting sections of either first or second current collectors located at opposite side edges thereof may be interconnected by a respective folding structure. In such embodiments the depth of the longitudinal indentation extending as a folding structure across a collecting section of a current collector may be substantially smaller than the thickness offset provided by the profiled section of the respective current collector.

Overall number, orientation and position of folding structures may depend on the overall geometry and size of the current collectors and the folding requirements of the electrochemical cell.

According to another embodiment, the at least one folding structure is oriented substantially perpendicular to the extension of the outer edge of the current collector. If for instance the electrochemical cell should be bendable along a particular bending or folding axis extending substantially perpendicular to a lateral edge of first and/or second current collectors, the respective folding structure should extend at right angle to the extension of the respective lateral edge. Given that the current collectors are of substantially quadratic or rectangular shape it may be beneficial to provide at least two folding structures extending perpendicular with respect to each other in order to provide a folding or bending of the electrochemical cell in the corresponding and mutually perpendicular directions, that may even match with the shape of the current collector. In this aspect, also various different angles between respective folding structures may be implemented depending on the folding demands of the electrochemical cell.

Moreover, and according to a further embodiment the folding structures form a rectangular and/or a triangular pattern across at least one of the first and second collecting portions of the respective current collector. Typically, the longitudinal and rather straight shaped folding structures extend across the complete collecting portion of a respective current collector. In this way, oppositely located outer edges of respective current collectors, that are formed by oppositely located portions of circumferential connecting portions thereof may be structurally interconnected by respective folding structures.

According to another embodiment, the first current collector and the second current collector may also form an encapsulating housing for the first and second electrodes and for a separator typically disposed therebetween. In this way, a conventional housing or encapsulation of an electrochemical cell can be effectively replaced by first and second current collectors, representing anode and cathode current collectors. Here, first and second current collectors may also provide mechanical stability and mechanical protection for the complete electrochemical cell.

Apart from this mechanical aspect the current collectors may be integrally formed with anode and cathode collector tabs. A separate interconnection of connector tabs and current collectors may therefore become superfluous. In this way, a rather space saving arrangement can be provided for an electrochemical cell. Since a separate encapsulation or housing is no longer required, the size of cathode and anode can be increased without increasing the outer dimensions of the electrochemical cell itself. Consequently, the storage capacity and hence the energy density of the electrochemical cell can be increased.

According to another embodiment, the electrochemical cell is designed as a primary or secondary battery. The electrochemical cell may be further designed for various application purposes. In particular and without limitation, the electrochemical cell may be applicable in a time piece or watch, in a smartcard or in a cellular phone.

BRIEF DESCRIPTION OF THE DRAWINGS

In the following, various embodiments of the invention will be described by making reference to the drawings, in which:

FIG. 2 shows a schematic perspective view of the electrochemical cell, FIG. 3 schematically depicts a cross-section along A-A according to

FIG. 2,

DETAILED DESCRIPTION

Figure 1:
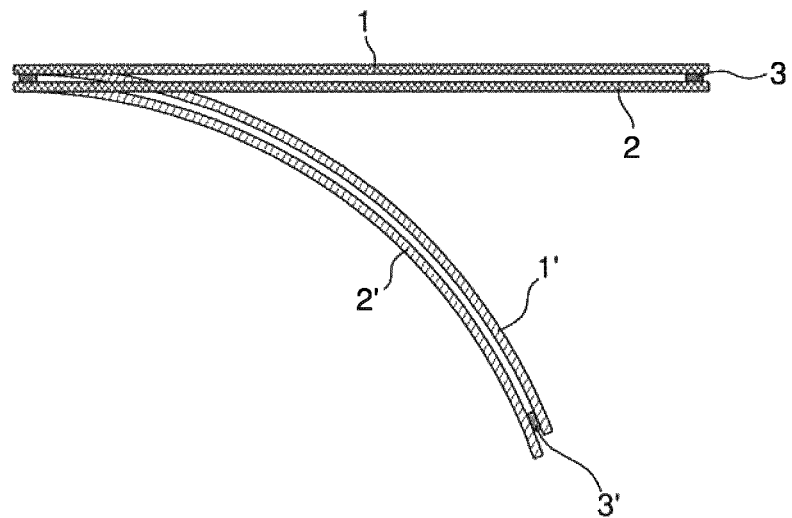
FIG. 1 schematically depicts a shearing effect when bending mutually bonded substrates or layers.
Figure 2:
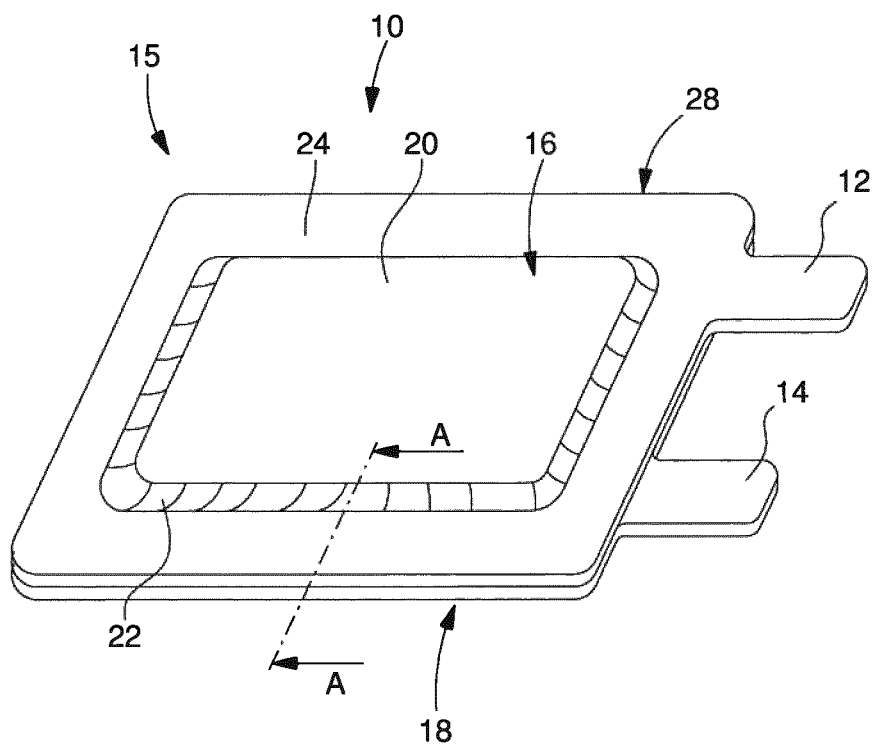
Figure 3:
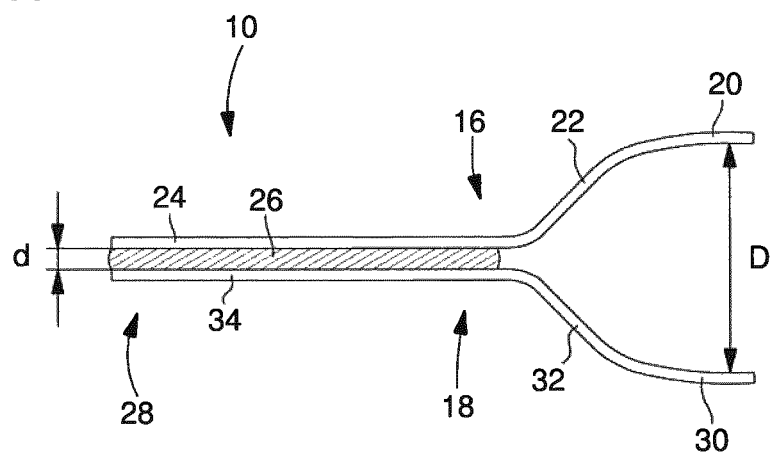
Figure 4:
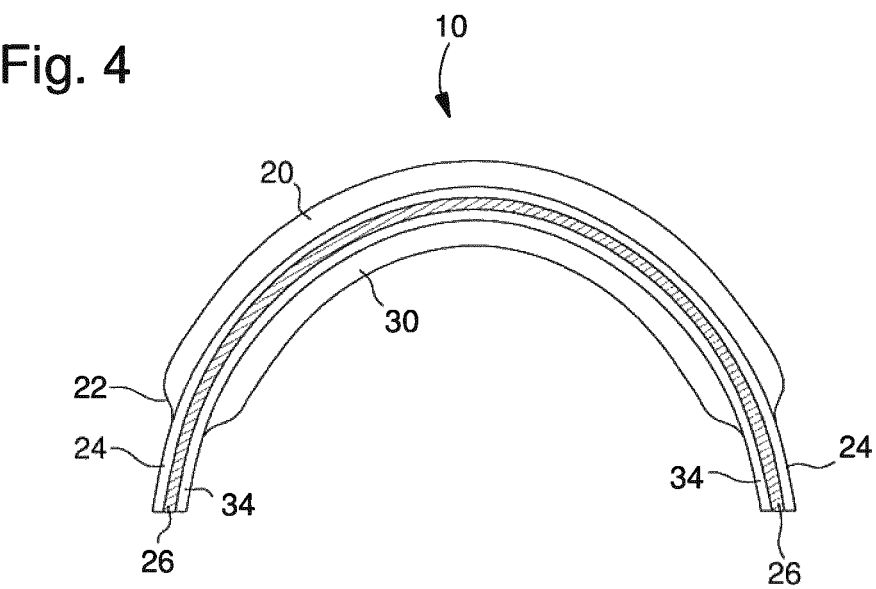
FIG. 4 schematically shows a bended electrochemical cell according to FIG. 2 in a side view.

The electrochemical cell 10 as it is schematically illustrated in FIGS. 2-4 comprises a first current collector 16 and a second current collector 18. While in the perspective illustration according to FIG. 2 only the upper, first current collector 16 is illustrated, the shape and arrangement of the second or lower current collector 18 is discernible from FIGS. 3 and 4. The first current collector 16 comprises a connector tab 12 that may be integrally formed with the first current collector 16. The same may also apply to the second current collector 18 featuring an integrally formed connector tab 14.

First and second current collectors 16, 18 each comprise a collecting section 20, 30 and a connecting section 24, 34 as illustrated in FIG. 3. For instance, the first connecting section 24 of the first current collector 16 is integrally formed with the first collecting section 20. The first collecting section 20 merges into the first connecting section 24 via a first profiled section 22. While the first collecting section 20 and the first connecting section 24 are oriented substantially parallel to each other the first profiled section 22 merging with the first connecting section 24 and with the first collecting section 20 serves as a ramp or as a bridging portion in regard to the surface normal of the first collecting section 20 or of the first connecting section 24.

In a similar way also the second current collector 18 comprises a second collecting section 30 overlapping with the first collecting section 20 and comprises a second connecting section 34 substantially overlapping with the first connecting section 24 and extending substantially parallel to the first connecting section 24. The second current collector 18 also comprises a second profiled section 32. Due to the first and second profiled sections 22, 32, the respective first and second current collectors 16, 18 feature different distances D, d between first and second collecting portions 20, 30 and between first and second connecting portions 24, 34.

In particular, in the region of first and second overlapping connecting sections 24, 34 the distance d is reduced to at least 50% of the distance D of first and second collecting sections 20, 30. In this way, the thickness of an adhesive 26 sandwiched between first and second connecting portions 24, 34 can be effectively reduced compared to the distance D. In this way, adhesives, such like epoxy glue or epoxy resins that provide sufficient tightness and sealing capability for the electrochemical cell 10 can be used to mutually connect and to mutually bond first and second current collectors 16, 18 in a gas- and liquid-tight manner. Preferably, the first and second connecting sections 24, 34 of first and second current collectors 16, 18 extend along the entire circumference of the first and second current collectors 16, 18. In this way, the first and the second current collectors 16, 18 provide an encapsulating housing 15 for the electrochemical cell.

Due to the distance reduction in the region of the lateral first and second connecting sections 24, 34, an excellent bending or flexural behavior of the electrochemical cell 10 can be provided even when making use of comparatively rigid or stiff adhesives 26. In particular, the overall flexibility of first and second current collectors 16, 18 and/or of the entire electrochemical cell 10 may allow bending and flexing operations in a kink-free way up to a bending radius smaller than or equal to 20 mm, 50 mm or even smaller than or equal to 10 mm. Even with such small bending radius, numerous bending or flexing operations, at least 500 or more, can be conducted without significantly deteriorating the electrical or mechanical properties of the current collector 16, 18 or of their sealing adhesive 26.

First and second profiled sections 22, 32 as illustrated in FIG. 3 may however counteract the flexibility of the electrochemical cell 10. In order to at least compensate and to generally improve the flexural behavior of the electrochemical cell 10 at least one longitudinal indentation 44 is introduced in at least one of first and second current collectors 16, 18. In the embodiment according to FIG. 7 a plurality of equidistantly positioned and parallel oriented folding structures 40 are introduced across the first current collector 16 and the second current collector 18.

Figure 8:
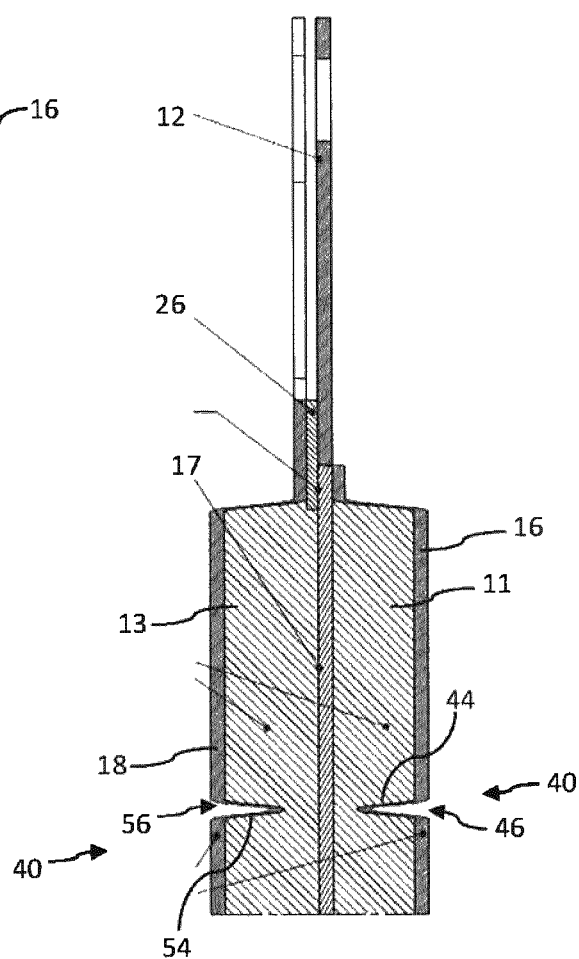
FIG. 8 shows a cross-section along B-B according to FIG. 7.
Figure 9:
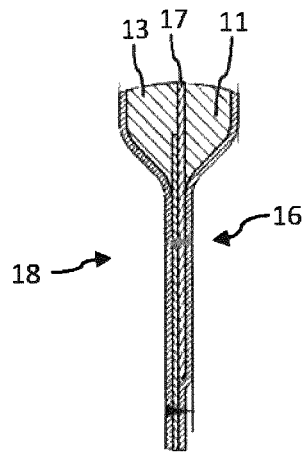
FIG. 9 shows a cross-section along C-C according to FIG. 7

As illustrated in FIG. 8, a first indentation 44 is provided on the outer surface of the first current collector 16 thereby forming a longitudinal groove 46. The indentation 44 extends towards the interior of the electrochemical cell 10 and hence towards the separator 16 that serves to electrically separate first and second electrodes 11, 13 that are in electrical contact with first and second current collectors 16, 18, respectively.

In an overlapping manner with the first groove 46 also the second current collector 18 comprises a second inwardly extending indentation 54 forming a second groove 56. Since first and second grooves 46, 56 are located on opposite sides of the electrochemical cell 10 in an overlapping manner, the overall thickness of the electrochemical cell 10 is locally reduced, which enables and supports a bending or folding of the electrochemical cell 10 along a folding structure 40 thus formed by the overlapping grooves 46, 56.

Figure 7:
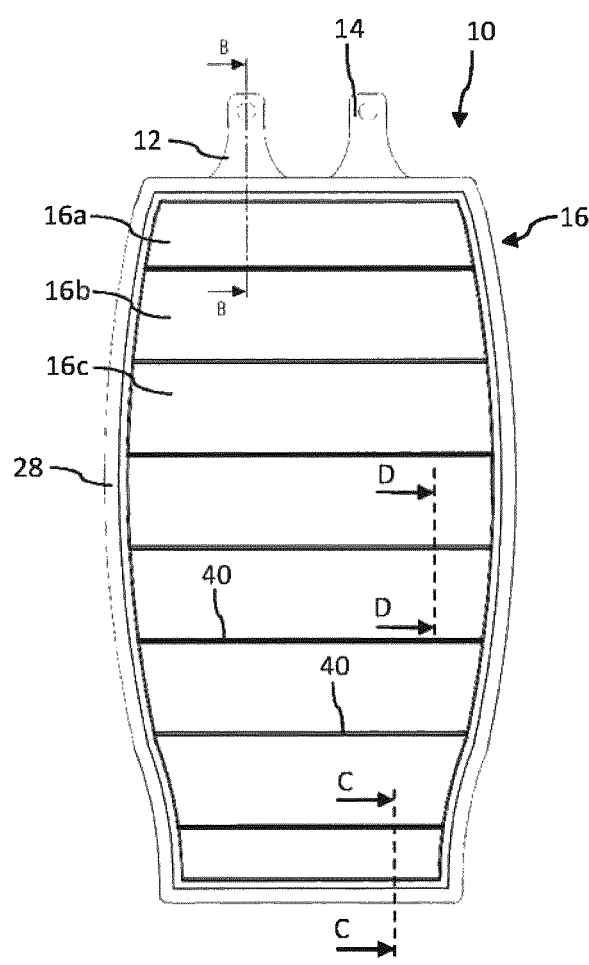
FIG. 7 shows a further embodiment of an electrochemical cell in a top view.

By regularly arranging numerous folding structures 40 across the first current collector 16 and across the second current collector 18, the electrochemical cell 10 can be segmented into various current collector segments 16a, 16b, 16c as indicated in FIG. 7. While each of these segments 16a, 16b, 16c may be rather rigid or stiff, the folding structures 40 extending therebetween may thus enable a substantially wear free bending or folding of the respective electrochemical cell 10. Hence, the various segments 16a, 16b, 16c may act and operate as a kind of bracelet links.

Figure 10:
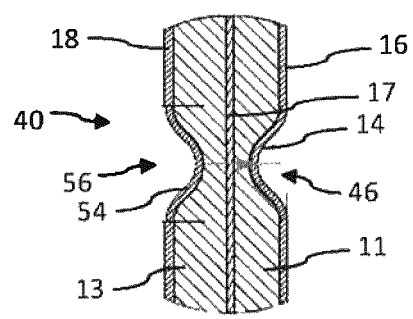
FIG. 10 shows a cross-section along D-D according to FIG. 7.

Geometric shape and depth of first and second indentations 44, 54 may vary in accordance with the required flexural behavior of the electrochemical cell 10. The depth of the first and/or second indentation 44 may be in the range of the width thereof as illustrated in cross-section of FIG. 10. As indicated in FIG. 8, the depth of the first indentation 44 and/or of the second indentation 54 may be as large as two or three times the width of the respective first or second indentation 44, 54. Moreover, also the geometric shape, in particular the slope and the inwardly located bottom portion of the indentation 44, 54 may either be rounded off or may exhibit a tapered profile.

Figure 5:
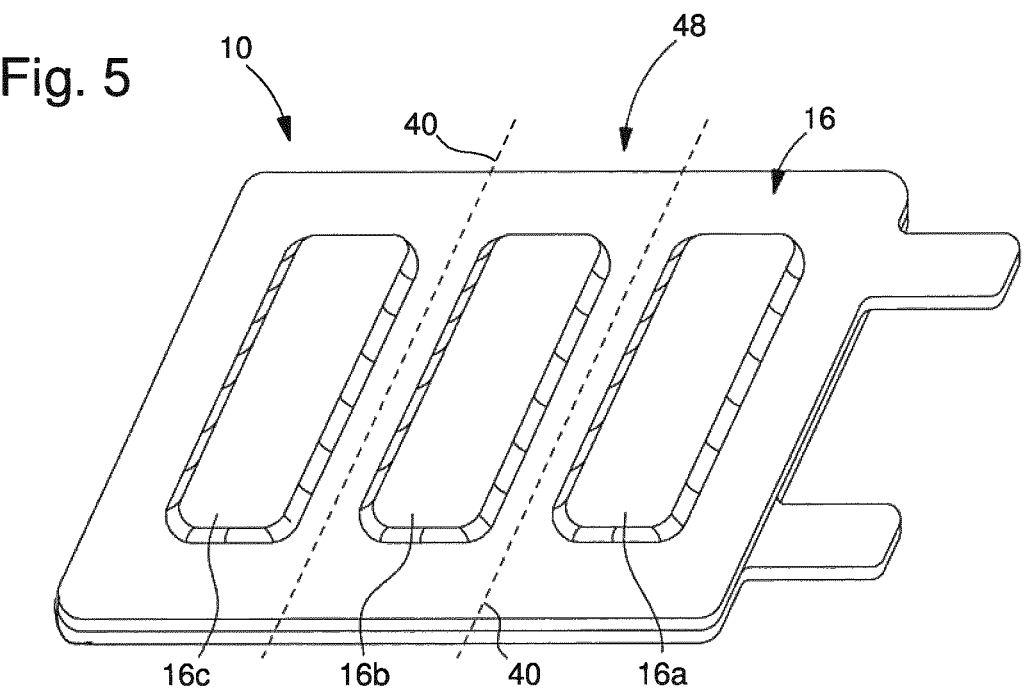
FIG. 5 shows another embodiment of the electrochemical cell with two separate but parallel oriented folding structures.

The embodiment as illustrated in FIG. 5 shows three segments 16a, 16b, 16c of the first current collector 16. Since the folding structures 40 separating said segments 16a, 16b, 16c extend substantially parallel they form a rectangular pattern 48. Consequently, the segments 16a, 16b, 16c are also of substantially rectangular structure. In the embodiment according to FIG. 6 there are provided two pairs of perpendicularly oriented folding structures 40, 41 and folding structures 42, 43. Here, the first current collector 16 is separated into eight triangular-shaped sections and the folding structures 40, 41, 42, 43 form a triangular pattern 49. The folding structures 40, 41, 42 and 43 all extend across the entire collecting portion 20 of the first current collector 16 and intersect in a central portion of the first current collector 16.

Figure 6:
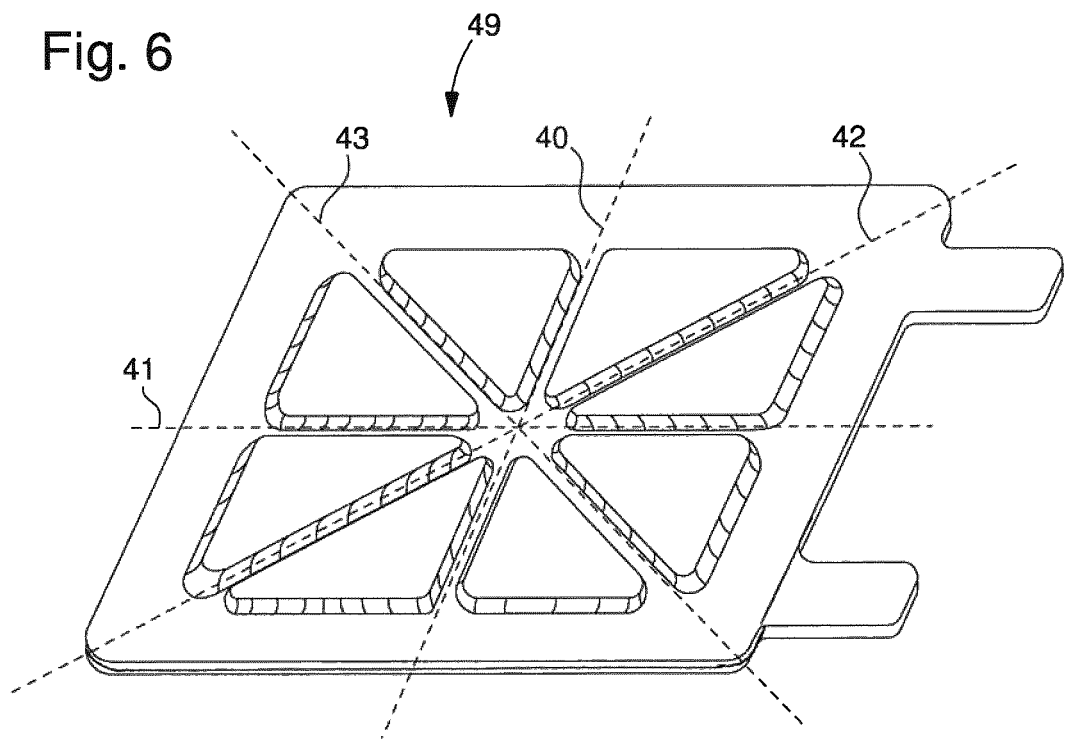
FIG. 6 shows another embodiment of the electrochemical cell with a plurality of differently oriented folding structures.

As indicated in FIG. 6, the folding structure 40 extends substantially perpendicular to the folding structure 41 and the folding structure 42 extends substantially perpendicular to the folding structure 43. Additionally, the folding structures 42, 43 extend at an angle of approximately 45° with respect to the folding structures 40, 41.

By providing a plurality of differently oriented folding structures 40, 41, 42, 43, the electrochemical cell 10 can be bended along respective folding axis or directions.

The electrochemical cell of the invention can be advantageously integrated in an electronic wristwatch of the flexible type including in particular an electric power source unit, a timekeeping circuit unit, and a display unit for displaying time related data and a flexible substrate for at least one said units, wherein, said power source unit includes a flexible electrochemical cell as disclosed hereinabove. Typically these units are mounted on a flexible printed circuit film, which is then incorporated by overmoulding of an insulating elastomeric material forming thus a wristband.

In other applications, the electrochemical cell of the invention can be advantageously integrated as a power source in other electronic devices such as in a mobile phone apparatus, a smartcard, a portable Global Positioning System, a portable computer, a tablet computer, a heart rate monitor, MP3 player, walkmann and the like.

LIST OF REFERENCE NUMERALS 1 substrate
2 substrate
3 adhesive
10 electrochemical cell
11 electrode
12 connector tab
13 electrode
14 connector tab
15 housing
16 current collector
16a segment
16b segment
16c segment
17 separator
18 current collector
20 collecting section
22 profiled section
24 connecting section
26 adhesive
28 edge
30 collecting section
32 profiled section
34 connecting section
40 folding structure
41 folding structure
42 folding structure
43 folding structure
44 indentation
46 groove
48 rectangular pattern
49 triangular pattern
54 indentation
56 groove

The invention claimed is:

1. An electrochemical cell, comprising:
a first current collector comprising a first collecting section in contact with a first electrode and comprising a first connecting section;
a second current collector overlapping with the first current collector and comprising a second collecting section in contact with a second electrode and comprising a second connecting section;
wherein the first and second current collectors are mutually connected via their first and second connecting sections;
wherein a distance between the first and second connecting sections is equal to or smaller than 50% of the distance between the first and the second collecting sections;
wherein the first current collector comprises a plurality of first inwardly extending longitudinal indentations, the second current collector comprises a plurality of second inwardly extending longitudinal indentations, and the first inwardly extending longitudinal indentations are arranged to overlap with the second inwardly extending longitudinal indentations.

2. The electrochemical cell according to claim 1, wherein at least one of the first and second collecting sections is integrally formed with the respective first or second connecting section.

3. The electrochemical cell according to claim 1, wherein at least one of the first and second current collectors comprises a first or second profiled section between the first or second collecting section and the first or second connecting section, respectively.

4. The electrochemical cell according to claim 3, wherein at least one of the first and second profiled sections merges with the first or second collecting sections and with the first or second connecting sections, respectively.

5. The electrochemical cell according to claim 3, wherein at least one of the first and second profiled sections comprises a flattened or stretched Z-shaped profile.

6. The electrochemical cell according to claim 1, wherein the distance between the first and second connecting sections is equal to or smaller than 100 μm, 80 μm, 50 μm or is between 50 μm and 25 μm.

7. The electrochemical cell according to claim 1, wherein the first and second connecting sections are mutually bonded by an insulating adhesive to form an outer edge.

8. The electrochemical cell according to claim 7, wherein the adhesive comprises an epoxy glue.

9. The electrochemical cell according to claim 8, wherein at least one of the first and second current collectors comprises at least two separated or intersecting folding structures.

10. The electrochemical cell according to claim 9, wherein at least two of the folding structures extend parallel with respect to each other or at a predetermined angle between 30° and 90° with respect to each other, in the plane of the first and/or second collecting sections.

11. The electrochemical cell according to claim 9, wherein at least one folding structure is oriented perpendicular to an extension of an outer edge.

12. The electrochemical cell according to claim 9, wherein the folding structures form a rectangular pattern and/or a triangular pattern across at least one of the first and second collecting portions.

13. The electrochemical cell according to claim 1, wherein the first current collector and the second current collector form an encapsulating housing for the first and second electrodes.

14. The electrochemical cell according to claim 1, wherein the cell is integrated as a power source in an electronic device chosen amongst a mobile phone apparatus, a smartcard, a portable Global Positioning System, a portable computer, a tablet computer, a heart rate monitor, MP3 player, and walkman.

* * * * *